United States Patent [19]
Faulk

[11] Patent Number: 5,818,705
[45] Date of Patent: *Oct. 6, 1998

[54] PORTABLE COMPUTER HAVING BUILT-IN AC ADAPTER INCORPORATING A SPACE EFFICIENT ELECTROMAGNETIC INTERFERENCE FILTER

[75] Inventor: Richard A. Faulk, Cypress, Tex.

[73] Assignee: Compaq Computer Corporation, Houston, Tex.

[*] Notice: The term of this patent shall not extend beyond the expiration date of Pat. No. 5,636,112.

[21] Appl. No.: 828,749

[22] Filed: Mar. 26, 1997

Related U.S. Application Data

[63] Continuation of Ser. No. 502,197, Jul. 13, 1995, Pat. No. 5,636,112.

[51] Int. Cl.$^6$ .............................. H02M 1/12; H02M 1/14
[52] U.S. Cl. ................................. 363/48; 363/45
[58] Field of Search ........................... 363/37, 45, 47, 363/48, 50, 53

[56] References Cited

U.S. PATENT DOCUMENTS

| | | |
|---|---|---|
| 4,580,112 | 4/1986 | Winslow et al. .......................... 333/12 |
| 4,849,950 | 7/1989 | Sugiura et al. . |
| 5,080,218 | 1/1992 | Izume et al. . |
| 5,142,439 | 8/1992 | Huggett et al. . |
| 5,148,095 | 9/1992 | Miller et al. . |
| 5,636,112 | 6/1997 | Faulk ........................................ 363/48 |

*Primary Examiner*—Stuart N. Hecker

[57] ABSTRACT

An internal AC adapter which incorporates a space efficient EMI filter is positioned within a main chassis portion of a portable personal computer having at least one energy-demanding component also positioned within the main chassis portion. The internal AC adapter, which converts alternating current received from an alternating current main to direct current for transmission to the energy-demanding components, includes a first connector for electrically connecting the internal AC adapter to the alternating current main, a bridge rectifier circuit having an AC input side electrically connected to the first connector and a DC output side and a space efficient electromagnetic interference filter having an input side electrically connected to the DC output side of the bridge rectifier circuit and an output side. The bridge rectifier circuit converts alternating current received from the first connector to direct current for transmission to the electromagnetic interference filter. In turn, the electromagnetic interference filter includes at least one capacitative element for filtering noise from the direct current transmitted thereto by the bridge rectifier circuit. The filtered direct current is then transmitted to the energy-demanding components electrically connected to the output side of the electromagnetic interference filter. By placing the electromagnetic interference filter on the DC output side of the bridge rectifier circuit, reduced size capacitors such as a multilayer ceramic capacitor may be used as the capacitative element.

18 Claims, 3 Drawing Sheets

PORTABLE COMPUTER HAVING BUILT-IN AC ADAPTER INCORPORATING A SPACE EFFICIENT ELECTROMAGNETIC INTERFERENCE FILTER

CROSS-REFERENCE TO RELATED APPLICATION

This is a continuation of application Ser. No. 08/502,197, filed Jul. 13, 1995, now issued as U.S. Pat. No. 5,636,112.

This application is related to U.S. patent application Ser. No. 08/502,198, now U.S. Pat. No. 5,625,535 entitled "Compact Construction for Portable Computer Power Supply", filed on even date herewith, assigned to the Assignee of the present application and hereby incorporated by reference as if reproduced in its entirety.

BACKGROUND OF THE INVENTION

1. Field of the Invention

The invention relates to portable computers having built-in AC adapters and, more particularly, to a built-in AC adapter positioned in a main chassis portion of a portable computer and having a space efficient electromagnetic interference filter incorporated therewith.

2. Description of Related Art

Portable, battery-powered computers have become increasingly popular in recent years due to their light weight and small size that permit them to be easily hand-carried in an ordinary briefcase and used by business travelers in cramped spaces lacking electrical plug-in facilities, for example, airline seat back trays. In fact, a particularly small type of portable computer, the notebook computer, which enjoys widespread popularity today is generally characterized by dimensions of 8.5"×11"and a weight of less than 8 pounds. More recent developments in computer miniaturization have resulted in so-called "subnotebook" computers having still smaller dimensions and even lower weights.

The modern portable computer is typically comprised of a pivoting display screen portion and a main chassis portion in which a keyboard, both hard and floppy disk drives, and possibly other components, for example, a modem or PCMCIA slot, are incorporated. Also provided on the main chassis portion is at least one port for coupling the portable computer to a peripheral device, for example, a printer. Thus, the portable computer is a fully self-contained computer system suitable for use, for at least short periods of time, in situations and locations in which the use of a much larger desktop computer is simply not feasible.

As is well-known, however, even state-of-the-art portable computers have certain limitations and disadvantages when compared to their much larger desktop computer counterparts. One principal disadvantage is that portable computers are battery-powered and thus are operable only when the battery is sufficiently charged. Fortunately, however, almost all battery-powered portable computers are sold with an AC adapter. When plugged into an AC main or other convenient source of AC power, the AC adapter converts the power into a form usable by the portable computer. The AC adapter includes a line cord that plugs into the AC power source and an adapter cord that plugs into a designated power supply port, typically located on a back side portion of the main chassis of the portable computer. Power conversion is performed in a power supply coupled between the line cord and adapter cord and housed in a power supply chassis which is separate from the main chassis.

There are historical reasons for the power supply being housed in a separate power supply chassis. Because of notoriously tight volumetric constraints in the main chassis of a portable computer, the components and subsystems thereof have, for years, been the subject of constant, extensive design work directed toward making such components and subsystems as small as possible. Because the main chassis has always been fully occupied with necessary components and subsystems, there was no motivation to attempt to fit in less vital subsystems, such as the power supply. Thus, because prior art power supplies have been entirely external to the portable computer, they were never subjected to the intense miniaturization effort otherwise applied to the portable computer.

Accordingly, the various components of the external power supply have remained relatively bulky. For example, power supplies typically include heat-producing components which require heat sinks to dissipate generated heat before the accumulated heat can damage nearby electronic devices. In the past, such heat dissipation was accomplished by physically mounting thermally conductive structures having bulky and heavy fins or projections to the heat-producing components. Thus, for these and other reasons, such prior art external power supplies have been large, heavy and cumbersome, earning them the unflattering colloquial term "brick." The bulky and clumsy "brick" stood in stark contrast to the otherwise elegant and compact design of prior art portable computers. Moreover, the external power supply has made the portable computer much more difficult to transport, thereby detracting from the ease of use of such devices.

While the relocation of the external power supply within the portable computer would solve many problems which result from the external power supply, the relatively bulky size of the power supply and the tight volumetric requirements of components within the portable computer has prevented such a relocation. To accomplish this task, not only would additional space need to be made available within the chassis of the portable computer, the power supply itself would need to undergo the same type of miniaturization effort through which the rest of the portable computer has already undergone. However, any proposed miniaturization or other reduction in size of a power supply would prove a difficult task and would likely entail an electrical redesign of the power supply in order to effect a minimization of the size of the components thereof.

In U.S. patent application Ser. No. 08/502,198 now U.S. Pat. No. 5,625,535 , filed on even date herewith and previously incorporated by reference, an internal power supply which incorporates a space efficient heat dissipation structure was disclosed. The disclosed heat dissipation structure eliminates the need for the relatively large heat sinks presently in use in external power supplies. There are, however, other internal components of the power supply which unnecessarily consume large amounts of space and which should also be the subject of size reduction efforts.

One such component is the aforementioned AC adapter. As previously stated, the function of the AC adapter is to convert high voltage AC power provided from the AC main, for example, an electrical outlet, to low voltage DC power suitable for use by the portable computer. Traditionally, the AC adapter has been located within the external power supply housing previously described herein. While it would be desirable to locate the AC adapter within the main housing chassis of the portable computer, certain design considerations has caused the AC adapter to be too large to fit within the relatively small space available within the main housing chassis.

Like all electronic devices, the AC adapter generates noise during the operation thereof. While no limits on such noise were initially imposed, to prevent noise generated by an electronic device from interfering with radio, television, navigational equipment or other devices, the FCC imposed a series of increasingly stringent regulations which limit the amount of transmitted and/or conducted noise signals which may escape from an electronic device. Accordingly, all AC adapters are equipped with an electromagnetic interference (or "EMI") filter to remove high frequency noise generated thereby. In turn, the design of an AC adapter having an EMI filter which removed sufficient noise such that the AC adapter was in compliance with FCC regulations caused the AC adapter, and certain ones of its components, specifically, the EMI filter, to become relatively large in size.

Specifically, the EMI filter is comprised of plural capacitative and inductive elements located between an AC connector and a bridge rectifier circuit of the AC adapter. Various governmental regulatory agencies, particularly in Europe, have very strict requirements for components located across a high voltage AC line. Thus, as the components of the EMI filter have traditionally been located between the AC main and the bridge rectifier circuit, they have been subject to these requirements.

More specifically, such governmental regulatory agencies typically require that a capacitor located across the high voltage AC line be a type "X" capacitor. Thus, in order to comply with this regulation, the capacitors of the EMI filter which are located between the AC connector and the bridge rectifier must be of type "X". However, type "X" capacitors are subject to stringent safety requirements which cause such capacitors to be relatively large and bulky. For example, a 0.10 $\mu$F type "X" capacitor takes up 0.118 cubic inches of space while a 0.22 $\mu$F type "X1" capacitor takes up 0.192 cubic inches of space. Thus, an AC adapter having an EMI filter located between the AC line and the bridge rectifier which respectively includes as the capacitor C1 and the capacitor C2, 0.10 $\mu$F and 0.22 $\mu$F type "X1" capacitor, to provide the necessary amount of filtering would consume 0.31 cubic inches of space merely for the capacitors of the EMI filter alone. Such an AC adapter would likely be considered too bulky to be suitable for placement within the main chassis of a portable computer.

As all capacitor and inductor components of the EMI filter have traditionally been located between the AC main and the bridge rectifier circuit, such components have tended to be relatively large. What is needed in the art is a reduced size EMI filter suitable for use with an AC adapter portion of a power supply. If such an AC adapter were achieved, the volume of the power supply would be reduced such that the power supply could be made to fit within the confines of the main chassis portion of a portable computer system. It is, therefore, an object of the present invention to provide such a internal power supply for a portable computer.

SUMMARY OF THE INVENTION

In one embodiment, the present invention is of a volume efficient line filter which includes a first connector for electrically connecting the AC adapter to an alternating current main, a bridge rectifier circuit having an AC input side electrically connected to the first connector, an electromagnetic interference filter having an input side electrically connected to a DC output side of the bridge rectifier circuit and a second connector for electrically connecting a DC output side of the electromagnetic interference filter and a DC output line. The bridge rectifier circuit converts alternating current received from the first connector to direct current for transmission to the electromagnetic interference filter for noise removal. In various aspects thereof, the electromagnetic interference filter may include a multilayer ceramic capacitor electrically connected in parallel with the DC output side of the bridge rectifier circuit, first inductor means, electrically connected in parallel with the multilayer ceramic capacitor, for providing a common mode choke of line noise and second inductor means, electrically connected to the first inductor means, for providing a differential mode choke of line noise. In another aspect thereof, the volume efficient line filter may also include a bulk capacitor, electrically connected to the first and second inductor means, for converting direct current output by the bridge rectifier circuit into stored energy for transfer to the DC output line.

In another embodiment, the present invention is of a volume efficient power supply for converting alternating current from an alternating current main to direct current suitable for output to a DC output line. The volume efficient power supply includes a first connector for electrically connecting the power supply to the alternating current main, a bridge rectifier circuit having an AC input side electrically connected to the first connector, an electromagnetic interference filter having an input side electrically connected to a DC output side of the bridge rectifier circuit and a second connector for electrically connecting a DC output side of the electromagnetic interference filter and a DC output line. The bridge rectifier circuit converts alternating current received from the first connector to direct current for transmission to the electromagnetic interference filter for noise removal. In various aspects thereof, the electromagnetic interference filter may include a multilayer ceramic capacitor electrically connected in parallel with the DC output side of the bridge rectifier circuit, first inductor means, electrically connected in parallel with the multilayer ceramic capacitor, for providing a common mode choke of line noise and second inductor means, electrically connected to the first inductor means, for providing a differential mode choke of line noise.

In a further aspect thereof, the volume efficient AC adapter may also include a bulk capacitor, electrically connected to the first and second inductor means, for converting direct current output by the bridge rectifier circuit into stored energy for transfer to energy demanding components coupled to the DC output line. In further aspects of this embodiment of the invention, the volume efficient power supply is coupled to a portable personal computer and preferably housed within a main chassis portion thereof.

In yet another embodiment, the present invention is of a volume efficient AC adapter for converting alternating current from an alternating current main to direct current suitable for use by a portable personal computer. The volume efficient AC adapter includes a first connector for electrically connecting the AC adapter to the alternating current main, a bridge rectifier circuit having an AC input side electrically connected to the first connector, an electromagnetic interference filter having an input side electrically connected to a DC output side of the bridge rectifier circuit and a second connector for electrically connecting a DC output side of the electromagnetic interference filter and the portable personal computer. The bridge rectifier circuit converts alternating current received from the first connector to direct current for transmission to the electromagnetic interference filter for noise removal. In various aspects thereof, the electromagnetic interference filter may include a multilayer ceramic capacitor electrically connected in parallel with the DC output side of the bridge rectifier circuit, first inductor means, electrically connected in parallel with the multilayer ceramic capacitor, for providing a common mode choke of line noise and second inductor means, electrically connected to the first inductor means, for providing a differential mode choke of line noise.

In further aspects thereof, the volume efficient AC adapter may also include a bulk capacitor, electrically connected to the first and second inductor means, for converting direct current output by the bridge rectifier circuit into stored energy for transfer to the portable personal computer, a transient voltage suppressor, either electrically connected in parallel with the AC input side of the bridge rectifier circuit or electrically connected in parallel with the multilayer ceramic capacitor, and a fuse electrically connected between the first connector and the AC input side of the bridge rectifier circuit.

In still another embodiment, the present invention is of an internal AC adapter positioned within a main chassis portion of a portable personal computer having at least one energy-demanding component also positioned within the main chassis portion. The internal AC adapter, which converts alternating current received from an alternating current main to direct current for transmission to the energy-demanding components, includes a first connector for electrically connecting the internal AC adapter to the alternating current main, a bridge rectifier circuit having an AC input side electrically connected to the first connector and a DC output side, and a space efficient electromagnetic interference filter having an input side electrically connected to the DC output side of the bridge rectifier circuit and an output side. The bridge rectifier circuit converts alternating current received from the first connector to direct current for transmission to the electromagnetic interference filter. In turn, the electromagnetic interference filter includes at least one capacitive element for filtering noise from the direct current transmitted thereto by the bridge rectifier circuit. The filtered direct current is then transmitted to the energy-demanding components electrically connected to the output side of the electromagnetic interference filter. By placing the electromagnetic interference filter on the DC output side of the bridge rectifier circuit, reduced size capacitors such as a multilayer ceramic capacitor may be used as the capacitive element.

In one aspect thereof, the multilayer ceramic capacitor or other reduced size capacitative element is electrically connected in parallel with the DC output side of the bridge rectifier circuit. In another aspect thereof, the space efficient electromagnetic filter further includes at least one inductive element for blocking noise contained in the direct current transmitted to the electromagnetic interference filter by the bridge rectifier circuit. In yet another aspect, the internal AC adapter may also include an energy storage element such as a bulk capacitor electrically connected in parallel with the electromagnetic interference filter for converting direct current output by the bridge rectifier circuit into stored energy for transfer to the energy-demanding components of the portable personal computer.

In further aspects thereof, the internal AC adapter may alternately include a transient voltage suppressor electrically connected in parallel with the AC input side of the bridge rectifier circuit or a transient voltage suppressor electrically connected in parallel with the multilayer ceramic capacitor and a fuse electrically connected between the first connector and the AC input side of the bridge rectifier circuit. Finally, in yet another aspect of this embodiment of the invention, the first connector may be a plug-in connector for insertably receiving the alternating current main. In this aspect, the main chassis portion would define an access aperture through which the plug-in connector is accessed.

BRIEF DESCRIPTION OF THE DRAWING

The present invention may be better understood, and its numerous objects, features and advantages will become apparent to those skilled in the art by reference to the accompanying drawing, in which.

DETAILED DESCRIPTION

Figure 1A:
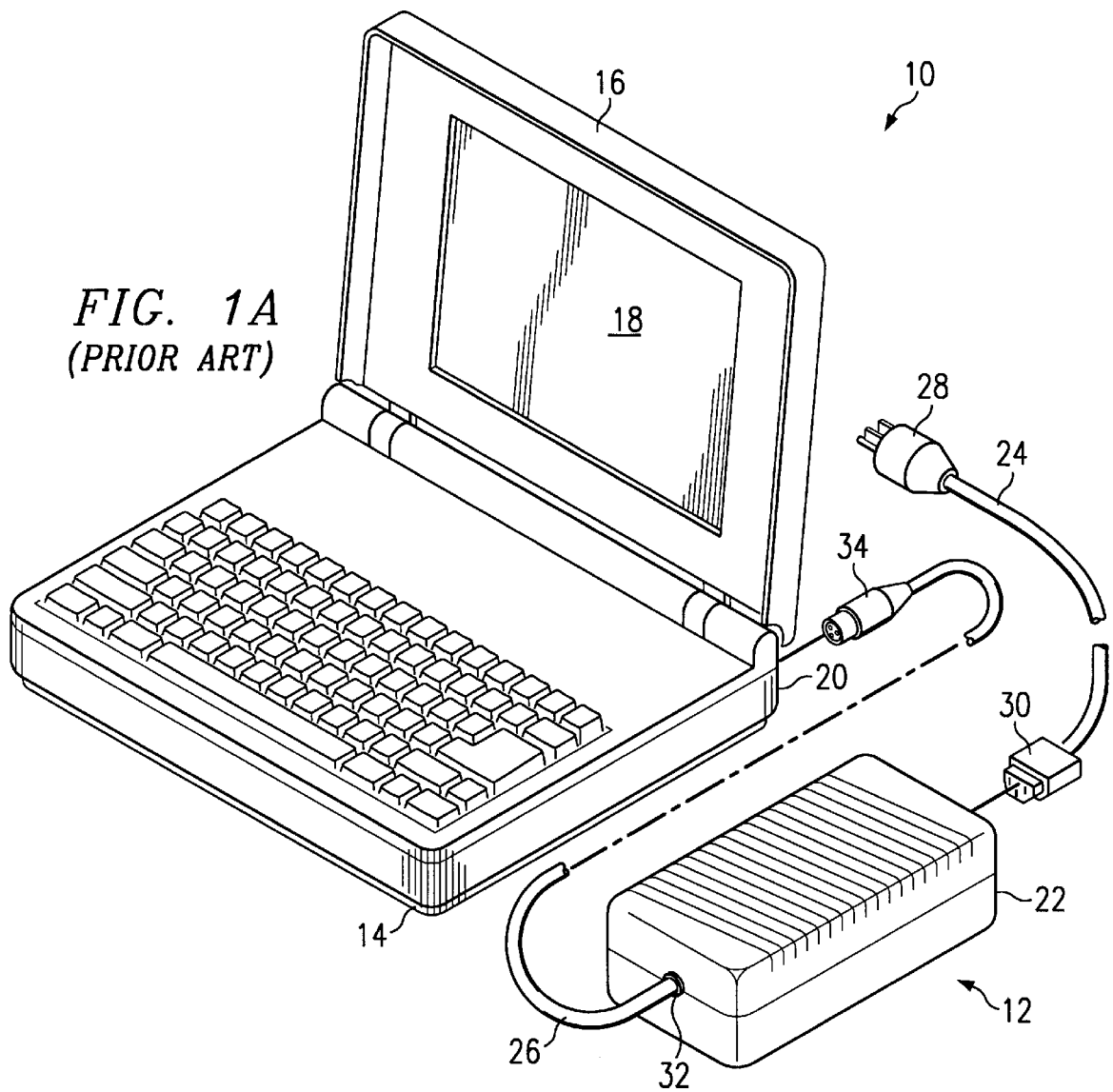
FIG. 1A is a perspective view of a prior art portable computer and an associated external power supply chassis in which an AC adapter is housed.

Referring now to the drawing wherein thicknesses and other dimensions have been exaggerated in the various figures as deemed necessary for explanatory purposes and wherein like reference numerals designate the same or similar elements throughout the several views, a prior art portable computer 10 and an associated external power supply 12 will now be described in greater detail. Typically, the external power supply 12 is designed to convert alternating current (or "AC") power to a form usable by the portable computer 10. As is well known, portable computers are typically designed to run on direct current (or "DC"), which is usually supplied by an internal DC battery (not shown). The DC battery is recharged by the user plugging the external power supply 12 into a conventional AC outlet that supplies the AC power, which is then converted into DC power by the external power supply 12. Alternatively, direct DC operational power may be supplied to the portable computer 10 from the AC source via the external power supply 12.

As seen in FIG. 1A, the prior art portable computer 10 has a base member 14 and a lid member 16 with a screen portion 18 mounted therein. The base member 14 is comprised of a main chassis portion 20 that houses the internal electrical components of the portable computer 10. The external power supply 12 has a brick-like housing 22 that surrounds and houses the internal electrical components (not visible in FIG. 1A) of the external power supply 12.

A distinct disadvantage associated with the external power supply 12 is that it often has an overall height that exceeds the overall height of the main chassis portion 20. Thus, it must be carried and used externally from the main chassis portion 20. Additionally, the weight of the external power supply 12 adds substantially to the total weight associated with the portable computer 10.

The external power supply 12 is also cumbersome to use and store because of the line cords associated with it. Typically, the external power supply 12 has two electrical line cords associated with it, an AC cord 24 and a DC cord 26, both of which are individually connectable to the external power supply 12. The AC cord 24 has a first end 28 that is designed to be electrically connected to an AC power source (not shown) such as an AC main and a second end 30 that is designed to be electrically connected to the external power supply 12. The DC cord 26 has a first end 32 that is designed to be electrically connected to the external power supply 12 and a second end 34 that is designed to be electrically connected to the portable computer 10. From these disadvantages, it is clear that a need has arisen for a portable computer with a light-weight, space-efficient power supply that can fit in the limited amount of space which is available within the main chassis portion of the portable computer.

Figure 1B:
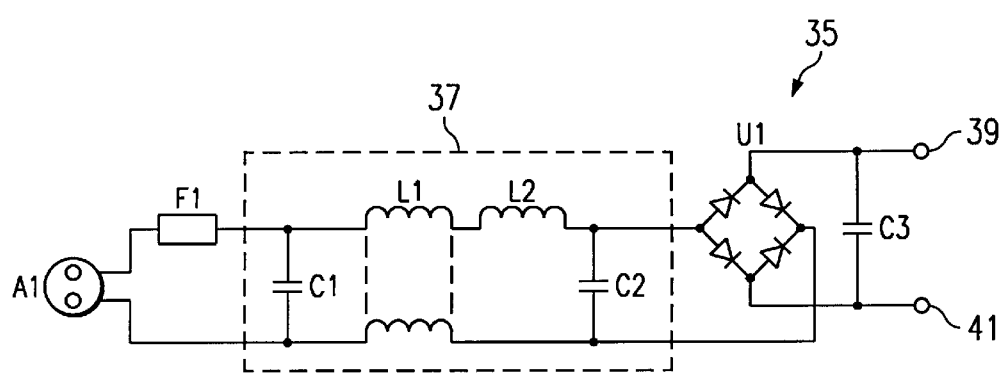
FIG. 1B is a schematic illustration of the AC adapter (which includes an EMI filter) housed within the external power supply chassis of FIG. 1A.

Referring next to FIG. 1B, an AC adapter 35 located within the housing 22 of the external power supply 12 will now be described in greater detail. The AC adapter 35 is coupled to the AC main by insertably connecting the second end 30 of the AC cord 24 to plug connector A1. Coupled to the plug connector A1 is a fuse F1 which protects the AC adapter 35 from short circuits and other internal faults which could potentially damage the AC adapter 35 by disconnecting the AC adapter 35 from the AC main upon detection of such fault conditions.

Located between the fuse F1 and bridge rectifier circuit U1 is EMI filter 37. The EMI filter 37 is comprised of a first capacitor C1 connected across the AC line, a first inductor L1 coupled to the first capacitor C1, a second inductor L2 connected in series with the first inductor L1 and a second capacitor C2 coupled to the first and second inductors L1 and L2. The inductor L1 is a common mode configured choke which filters noise which is common to both lines. The inductor L2 is a differential mode configured choke which filters noise that is differential on both lines, i.e. noise flowing in one line in a positive fashion and flowing out the other line in a negative fashion. The capacitors C1 and C2 are high quality capacitors which form a simple attenuation circuit. For high frequency noise, the capacitors C1 and C2 will short circuit the noise across the line while the inductors L1 and L2 block the noise.

The EMI filter 37 is coupled to an AC input side of bridge rectifier circuit U1. The bridge rectifier circuit U1 provides a full wave rectification of the input AC power supplied thereto which converts the supplied power to DC. Preferably, the bridge rectifier circuit U1 is rated at 800 volts. Coupled to a DC output side of the bridge rectifier circuit U1 is a capacitor C3. The capacitor C3 is a bulk capacitor, preferably, one rated at 250 volts, which provides energy for the power supply. More specifically, the full wave rectified DC power output by the bridge rectifier circuit U1 charges the capacitor C3. Energy-demanding components connected to the terminals 39, 41, for example, by plugging the second end 34 of the DC cord 26 into a corresponding DC plug (see FIG. 3) accessible from the rear side of the main chassis portion 20 may then draw on the power stored by the capacitor C3 as needed.

While the EMI filter 37 has proven acceptable in use, the primary shortcoming to its continued use in portable computers is that, being located on the AC side of the bridge rectifier circuit U1, the capacitors C1 and C2 must comply with the requirements for the X-type capacitor previously discussed. This causes the capacitors C1 and C2 to consume a relatively large amount of the space available within the interior of the housing 22 of the external power supply 12, thereby contributing significantly to the unsuitability of the AC adapter for placement within the main chassis portion.

Figure 2:
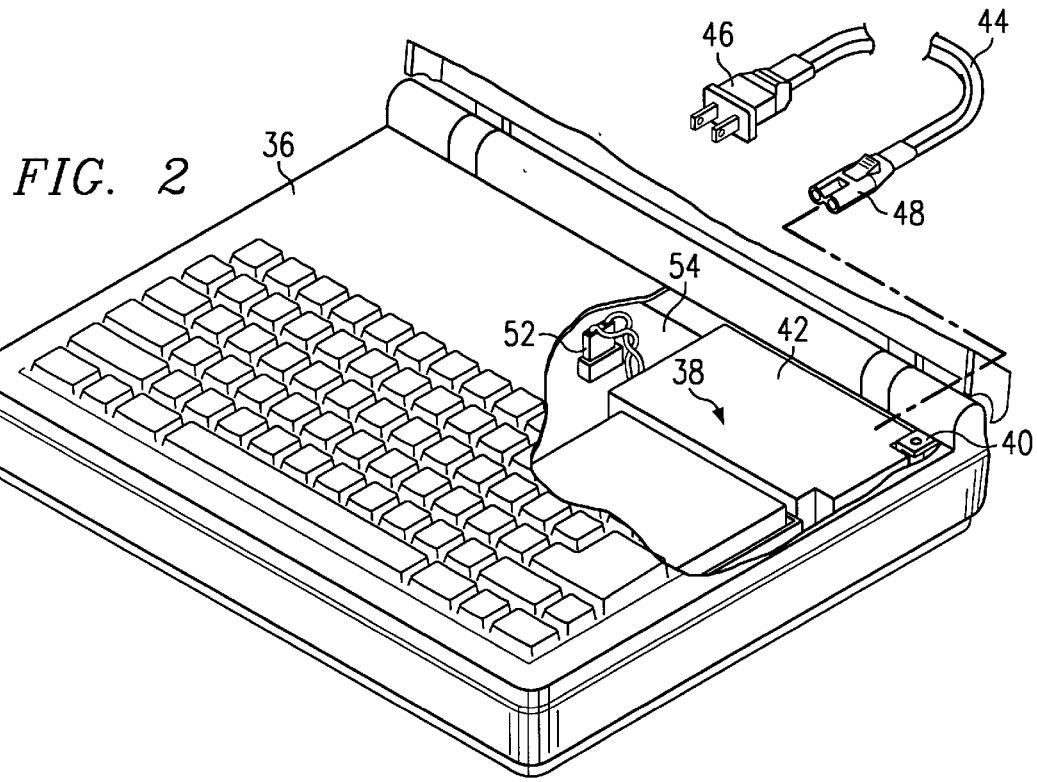
FIG. 2 is a partially cut-away perspective view of a portable computer chassis which includes an internal power supply module.

Referring next to FIG. 2, in a preferred embodiment thereof, illustrated is a partially cut-away perspective view of a main chassis portion 36 of a portable computer having an internal power supply module 38 constructed in accordance with the teachings of the present invention and, as will be more fully described below, which includes a built-in AC adapter which has been dramatically reduced in size by virtue of the incorporation of various space efficient components, including a reduced volume EMI filter. While the present invention is disclosed as incorporated into a volume efficient, internal AC adapter for a portable personal computer, it should be clearly understood that the invention is equally suitable for incorporation into a volume efficient power supply, either for a portable personal computer or other energy demanding device, or a volume efficient line filter.

The main chassis portion 36 for a portable computer illustrated herein is generally of conventional design with the exception that it is designed to completely contain the internal power supply module 38 therein. Preferably, the power supply module 38 has mounts 40 integral therewith so that it may be secured within the main chassis portion 36. The power supply module 38 is at least partially surrounded by a module electromagnetic shield 42. The power supply module 38 is extremely light-weight and has a miniaturized size and construction that allows it to be completely contained within the portable computer chassis 36. These distinct advantages reduce the bulkiness and the weight associated with conventional adapter devices. Moreover, because the power supply module 38 is secured within the portable computer chassis 36, the user does not have to handle a heavy, cumbersome brick external power supply equipped with one or more detachable cords, but can instead, fully utilize the power supply module 38 simply by plugging a cord into it and an appropriate power source.

Associated with the power supply module 38 is a power cord 44 that has a first end 46 designed to be electrically connected to a conventional external power supply outlet of at least 100 volts and at least 50 cycles, and a second end 48 designed to be connected directly to a line power input 50 of the power supply module 38. Preferably, the line power cord 44 is an electrical cord that is adapted to be connected to conventional outlets found throughout most nations in the world. More preferably, however, the line power cord 44 is adapted to be connected to a 110 volt, 60 cycle outlet. The power supply module 38 also preferably includes a motherboard connector 52 that enables the power supply module 38 to be removably connected directly to a motherboard 54 positioned within the portable computer chassis 36.

Figure 3:
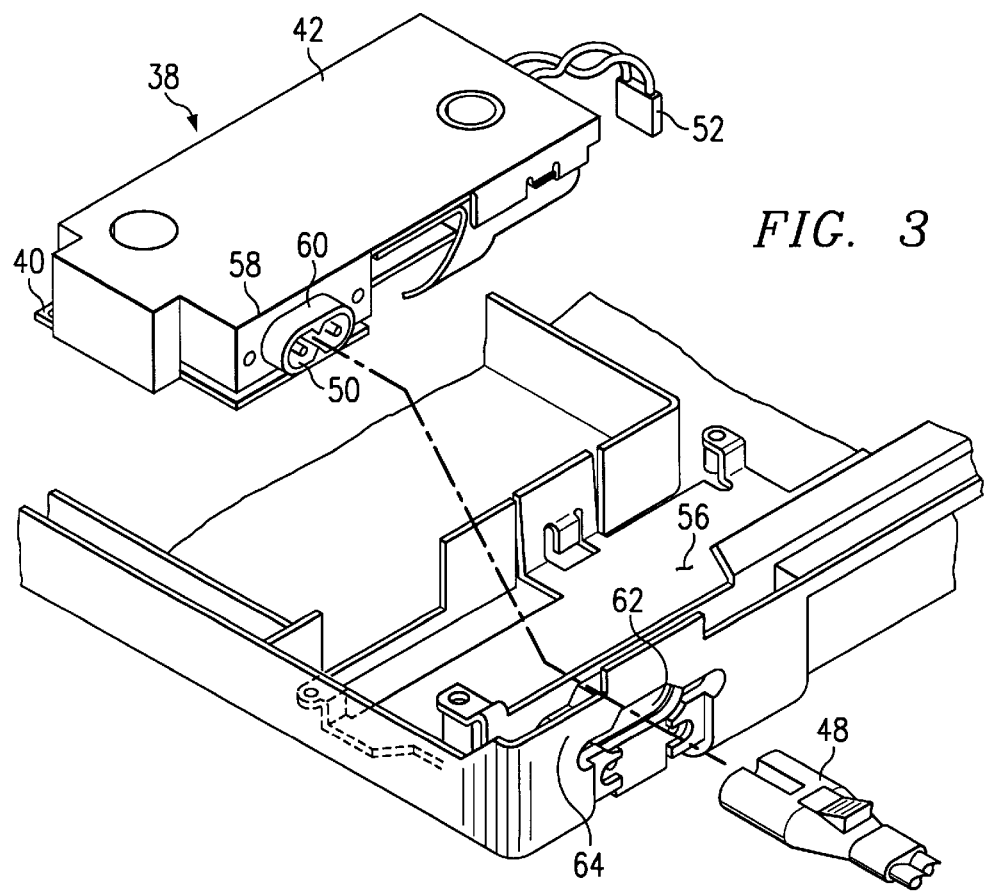
FIG. 3 is a partially exploded, perspective view of the portable computer chassis of FIG. 2 taken from the rear side thereof.

Referring next to FIG. 3, illustrated is a second perspective view of the portable computer chassis 36 of FIG. 2 taken from the rear side thereof and with the power supply module 38 exploded therefrom for clarity. In this view, the module electromagnetic shield 42 of the power supply module 38 is clearly illustrated. As seen in this preferred embodiment, the module electromagnetic shield 42 partially surrounds a circuit board and/or other electrical components (not shown) of the power supply module 38. The module electromagnetic shield 42 cooperates with a main chassis electromagnetic shield 56 of the portable computer chassis 36 to form an electromagnetic enclosure around the circuit board and/or other electrical components of the power supply module 38 when the power supply module 38 is secured within the main chassis electromagnetic shield 56. It should be clearly understood, however, that while the embodiment of the invention illustrated herein shows the module electromagnetic shield 42 only partially surrounding the circuit board and/or other electrical components of the power supply module 38, it will be appreciated by those skilled in the art that the module electromagnetic shield 42 could be made to completely surround the circuit board and/or other electrical components of the power supply module 38.

Positioned on a rear end portion 58 of the power supply module 38 is the line power input 50 that is adapted to receive electrical power directly from an external source via the power line cord 44. The line power input 50 preferably has a projecting retaining shell 60 that is designed to frictionally engage and hold the second end 48 of the line power cord 44. The shell 60 is also designed to extend through aperture 62 formed in a side wall 64 of the portable computer chassis 36, thereby providing easy accessibility to connect the line power cord 44 to the power supply module 38. The power supply module 38 may be positioned in the portable computer chassis 36 by tilting the rear end portion 58 in a downwardly fashion and positioning the projecting retaining shell 60 through the aperture 62.

Figure 4:
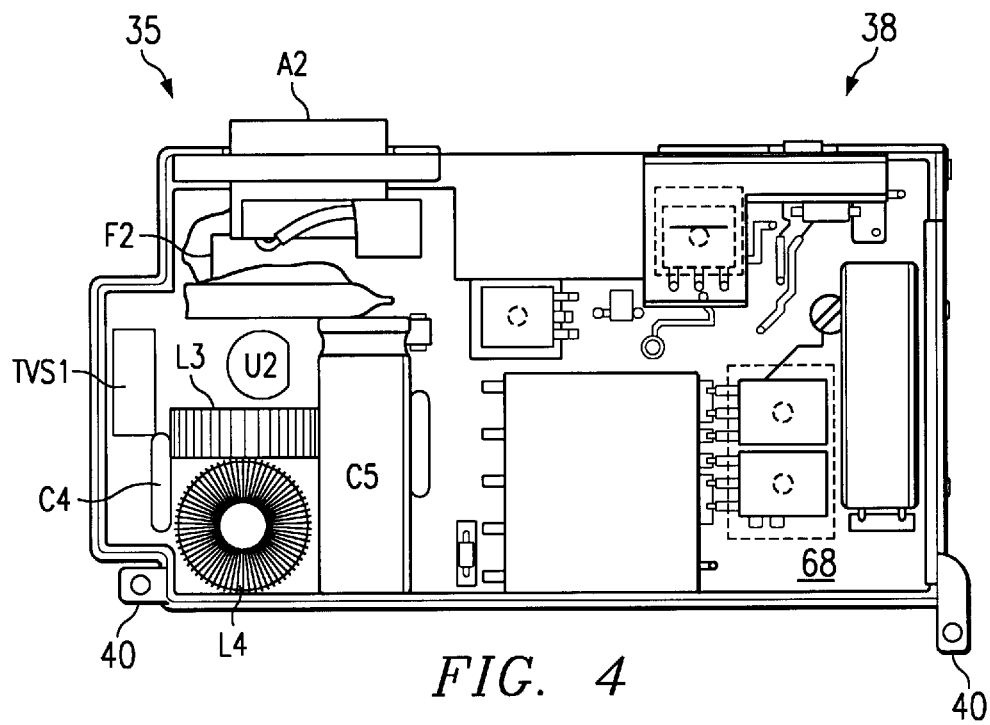
FIG. 4 is a top plan view of the internal power supply module of FIG. 2 which includes a built-in AC adapter constructed in accordance with the teachings of the present invention and incorporating a novel space efficient EMI filter therein.

Referring next to FIG. 4, a top plan view of the power supply module 38 of FIG. 3 will now be described in greater detail. As may now be seen, the power supply module 38 is comprised of a plurality of power supply components mounted onto a, now visible, printed circuit board 68. In a preferred embodiment, the power supply module 38 is a switching power supply module wherein selected ones of the plurality of the power supply components are switching devices, such as transistors. As may now be seen, the power supply module 38 includes a volume efficient, internal AC adapter 35 in which AC power supplied by the AC mains is converted into DC power for use by the energy-demanding components of the portable computer 10.

Figure 5:
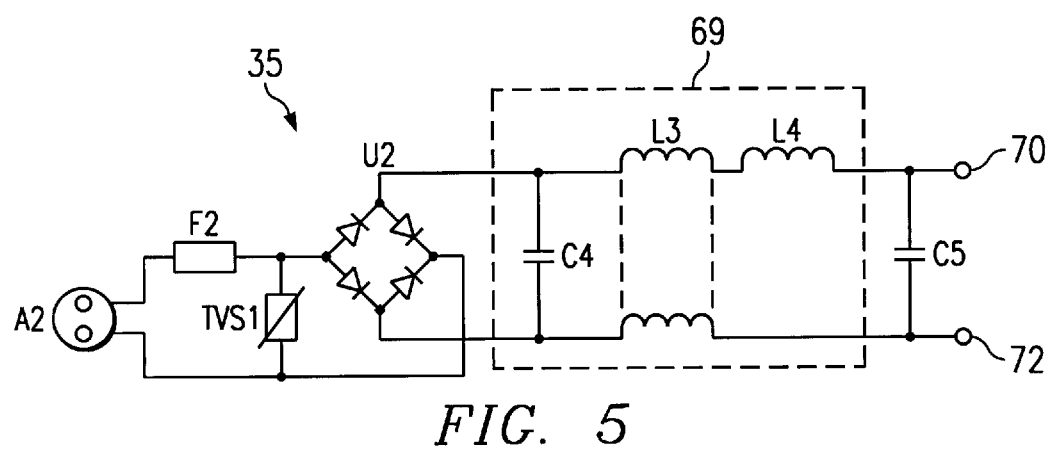
FIG. 5 is a schematic illustration of the built-in AC adapter and associated space efficient EMI filter of FIG. 4.

Collectively referring to FIGS. 4–5, the various electronic components which comprise the volume efficient, internal AC adapter 35 and the interconnection between these components will now be described in greater detail. The components of the volume efficient, internal AC adapter 35 include a plug connector A2, a fuse F2, a transient voltage suppressor TVS1, a bridge rectifier circuit U2 having AC and DC sides, a reduced volume EMI filter 69 (which itself is comprised of a multilayer ceramic capacitor C4, a first inductor L3 and a second inductor L4), and a charging capacitor C5. The plug connector A2 insertably receives the second end 48 of the line power cord 44 to couple the AC adapter 35 with the AC main. Coupled to one side of the plug connector A2 is the fuse F2 which, in the event of a short circuit or other internal fault, will open, thereby disconnecting the remaining components of the AC adapter 35 from the plug connector A2.

Connected across the AC line and located between the fuse F2 and the AC side of the bridge rectifier circuit U2 is the transient voltage suppressor TVS1. The transient voltage suppressor TVS1 shorts out very high voltage spikes, for example, those produced by a lightning strike. Typically, the transient voltage suppressor TVS1 is rated in such a way that it will permit 2,000 volts for 50 $\mu$seconds at the AC input. In an alternate embodiment of the invention not illustrated herein, the transient voltage suppressor TVS1 may be connected in parallel with the multilayer ceramic capacitor C4 on the DC side of the bridge rectifier circuit U2.

The bridge rectifier circuit U2, which, as previously set forth, converts unfiltered AC power from the AC mains into a full wave rectified DC output, includes an AC side connected across the AC line, i.e., in parallel with the transient voltage suppressor TVS1, and a DC side connected to the reduced volume EMI filter 69. The reduced volume EMI filter 69, which is comprised of the multilayer ceramic capacitor C4, the inductor L3, a common mode configured choke similar in operation to the inductor L1 in FIG. 1B and the inductor L4, a differential mode configured choke similar in operation to the inductor L2 in FIG. 1B, removes noise from the DC power output the DC side of the bridge rectifier circuit U2. Finally, the filtered DC output is stored in the charging capacitor C5 for transmission to energy-demanding components connected to the terminals 70, 72.

The multilayer ceramic capacitor C4 included as part of the reduced volume EMI filter 69 located on the DC side of the bridge rectifier circuit U2 is rated at 500 volts, continuous, and 1,000 volts, peak, removes noise from the DC power output of the bridge rectifier circuit U2. However, as the multilayer ceramic capacitor C4 has ten times the filter capacity, as compared to the capacitor C1 (even while consuming only a fraction of the volume of the capacitors C1 and C2), the capacitor C2 is no longer needed and the values of the inductors L3 and L4 may be reduced. Thus, by placing the reduced volume EMI filter 69 on the DC side of the bridge rectifier circuit U2, volumetrically smaller capacitors may be used in place of the "X"-type capacitors utilized in the EMI filter 37. For example, the exemplary EMI filter 37 previously described herein included a 0.10 $\mu$F capacitor as the capacitor C1 and a 0.22 $\mu$F capacitor as the capacitor C2 to provide the necessary amount of filtering. In contrast, the reduced volume EMI filter 69 could use, as the capacitor C4, a 1 $\mu$F multilayer ceramic capacitor. Typically, such a multilayer ceramic capacitor would consume 0.05 cubic inches of space. In comparison, the total volume of the capacitor C1 and the capacitor C2 of the EMI filter 37 consumes nearly eight times as much space. Moreover, the capacitor C4 of the reduced volume EMI filter 69 provides ten times the capacitance of the capacitor C1, thereby permitting the reduced volume EMI filter to enjoy superior filtering characteristics, even with numerically fewer capacitors.

Thus, there has been described and illustrated herein, a volume efficient, internal AC adapter which, by placing the EMI filter on the DC side of the bridge rectifier circuit, permits the use of reduced size capacitative components as part of the EMI filter. By reducing the size of the EMI filter, the AC adapter may be similarly reduced in size, thereby making the AC adapter more suitable for placement within the interior of the main body chassis of a portable computer. However, those skilled in the art will recognize that many modifications and variations besides those specifically mentioned may be made in the techniques described herein without departing substantially from the concept of the present invention. Accordingly, it should be clearly understood that the form of the invention as described herein is given by way of illustration and example only, the spirit and scope of the present invention being limited solely by the appended claims.

What is claimed is:

1. A computer system, comprising:
   a user input device, a display, and at least one energy demanding component connected to receive direct current from an AC adapter, said AC adapter including a volume efficient line filter which comprises:
   a bridge rectifier having input connections directly connectable to an alternating current main, and not connected to any capacitor; and
   an electromagnetic interference filter comprising only passive circuit elements and having an input side which is electrically connected to a DC output side of said bridge rectifier, said electromagnetic interference filter providing a filtered DC output.

2. The computer of claim 1, wherein said input connections of said bridge rectifier are connected to a transient voltage suppressor.

3. The computer of claim 1, wherein said input connections of said bridge rectifier are connected to a transient voltage suppressor, but are not connected to any electromagnetic interference filter.

4. The computer of claim 1, wherein said input connections of said bridge rectifier are not connected to any inductor.

5. The computer of claim 1, further comprising a fuse electrically connected between said input connections and said an alternating current main.

6. The computer of claim 1, wherein at least one capacitative element is connected in parallel with said DC output side of said bridge rectifier.

7. The computer of claim 1, wherein said electromagnetic interference filter comprises at least one series-connected inductor, and at least one parallel capacitative element.

8. The computer of claim 1, wherein said input connections are connected to a plug-in connector for insertion into a mains socket.

9. A portable personal computer comprising:
   a main chassis portion and at least one energy demanding component positioned within said main chassis portion,
   an internal AC adapter positioned within said main chassis portion, said internal AC adapter converting alternating current received from an alternating current main to direct current for transmission to said at least one energy demanding component, said internal AC adapter comprising:
      an input connection for electrically connecting said internal AC adapter to said alternating current main;
      a bridge rectifier having
         an AC input side electrically connected to said input connection and not to any capacitor, and
         a DC output side; and
      a space efficient electromagnetic interference filter comprising only passive circuit elements, and having an input side electrically connected to said DC output side of said bridge rectifier and an output side;
      said bridge rectifier converting alternating current received from said input connection to direct current for transmission to said space efficient electromagnetic interference filter;
      said space efficient electromagnetic interference filter including at least one capacitative element for filtering noise from said direct current transmitted to said space efficient electromagnetic filter by said bridge rectifier;
      said at least one energy-demanding component being electrically connected to said output side of said space efficient electromagnetic interference filter and receiving filtered direct current therefrom;
   whereby placement of said electromagnetic interference filter on said DC output side of said bridge rectifier enables usage of reduced size capacitors for said at least one capacitative element.

10. The computer of claim 9, wherein said AC input side of said bridge rectifier is connected to a transient voltage suppressor, but is not connected to any electromagnetic interference filter.

11. The computer of claim 9, wherein said AC input side of said bridge rectifier is not connected to any inductor.

12. The computer of claim 9, wherein said electromagnetic interference filter further comprises a multilayer ceramic capacitor electrically connected in parallel with said DC output side of said bridge rectifier.

13. The computer of claim 9, further comprising a transient voltage suppressor electrically connected in parallel with said AC input side of said bridge rectifier.

14. The computer of claim 9, further comprising a fuse electrically connected between said input connection and said AC input side of said bridge rectifier.

15. The computer of claim 9, wherein said at least one capacitative element is connected in parallel with said DC output side of said bridge rectifier.

16. The computer of claim 9, wherein said space efficient electromagnetic filter further comprises at least one inductive element for blocking noise contained in said direct current transmitted to said space efficient electromagnetic filter by said bridge rectifier.

17. The computer of claim 9, further comprising an energy storage element electrically connected in parallel with said space efficient electromagnetic interference filter, said energy storage element converting direct current output by said bridge rectifier into stored energy for transfer to said at least one energy-demanding component of portable personal computer.

18. The computer of claim 9, further comprising a plug-in connector for insertably receiving said alternating current main and wherein said main chassis portion defines an access aperture through which said plugin connector may be accessed.

* * * * *